(12) United States Patent
Yamada et al.

(10) Patent No.: US 9,468,907 B2
(45) Date of Patent: Oct. 18, 2016

(54) EXHAUST GAS COMPONENT PURIFICATION CATALYTIC MATERIAL AND CATALYZED PARTICULATE FILTER WITH THE CATALYTIC MATERIAL

(71) Applicant: MAZDA MOTOR CORPORATION, Hiroshima (JP)

(72) Inventors: Hiroshi Yamada, Hiroshima (JP); Takashi Baba, Hiroshima (JP); Koichiro Harada, Hiroshima (JP); Masahiko Shigetsu, Higashi-Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 96 days.

(21) Appl. No.: 14/371,000

(22) PCT Filed: Jan. 30, 2013

(86) PCT No.: PCT/JP2013/000506
§ 371 (c)(1),
(2) Date: Jul. 8, 2014

(87) PCT Pub. No.: WO2013/114876
PCT Pub. Date: Aug. 8, 2013

(65) Prior Publication Data
US 2014/0364305 A1 Dec. 11, 2014

(30) Foreign Application Priority Data
Jan. 31, 2012 (JP) ................. 2012-017635

(51) Int. Cl.
*B01J 23/10* (2006.01)
*B01D 53/94* (2006.01)
(Continued)

(52) U.S. Cl.
CPC .............. *B01J 23/10* (2013.01); *B01D 53/944* (2013.01); *B01J 23/002* (2013.01); *B01J 35/002* (2013.01); *B01J 35/04* (2013.01); *F01N 3/035* (2013.01); *B01D 2255/2063* (2013.01); *B01D 2255/2066* (2013.01); *B01D 2255/2068* (2013.01);
(Continued)

(58) Field of Classification Search
None
See application file for complete search history.

(56) References Cited

U.S. PATENT DOCUMENTS

2008/0207438 A1 8/2008 Suzuki et al.
2009/0000281 A1 1/2009 Nakatsuji et al.
(Continued)

FOREIGN PATENT DOCUMENTS

JP 2006-043533 A 2/2006
JP 2007-054713 A 3/2007
(Continued)

OTHER PUBLICATIONS

Wan et al(Oxygen Storage Capacity and Adsorptive Property of Praseodymium Oxides, J Rare Earths, vol. 21, No. 6, (2003) p. 609-612.*
(Continued)

*Primary Examiner* — Melvin C Mayes
*Assistant Examiner* — Michael Forrest
(74) *Attorney, Agent, or Firm* — Studebaker & Brackett PC (57) ABSTRACT

An exhaust gas component purification catalytic material 1 for use in removal of particulates in an exhaust gas through combustion includes: composite oxide particles 2 containing zirconium and neodymium and not containing cerium; and praseodymium oxide particles 3 in contact with the composite oxide particles 2.

11 Claims, 10 Drawing Sheets

(51) Int. Cl.
*B01J 23/00* (2006.01)
*B01J 35/04* (2006.01)
*F01N 3/035* (2006.01)
*B01J 35/00* (2006.01)

(52) U.S. Cl.
CPC . *B01D2255/20715* (2013.01); *B01D 2255/40* (2013.01); *B01D 2255/908* (2013.01); *B01D 2255/9202* (2013.01); *B01J 2523/00* (2013.01)

(56) References Cited

U.S. PATENT DOCUMENTS

2009/0084266 A1    4/2009    Yamada et al.
2009/0099012 A1*   4/2009    Suzuki ................ B01D 53/944
                                                502/303

FOREIGN PATENT DOCUMENTS

| JP | 2008-221204 A | 9/2008 |
| JP | 2009-101342 A | 5/2009 |
| JP | 2009-112951 A | 5/2009 |
| JP | 2010-005580 A | 1/2010 |
| JP | 2010-094628 A | 4/2010 |
| JP | 2010-269268 A | 12/2010 |

OTHER PUBLICATIONS

International Search Report; PCT/JP2013/000506; Mar. 19, 2013.

* cited by examiner

EXHAUST GAS COMPONENT PURIFICATION CATALYTIC MATERIAL AND CATALYZED PARTICULATE FILTER WITH THE CATALYTIC MATERIAL

TECHNICAL FIELD

The present invention relates to catalytic materials for use in removing particulates emitted from engines by combustion, and catalyzed particulate filters with such catalytic materials.

BACKGROUND ART

Vehicles using lean burn engines such as diesel engines include, in their exhaust gas passages, filters that collect particulates (particulate matters, i.e., PMs, such as carbonaceous particulates) in exhaust gas. When a large amount of PMs are accumulated on a filter, the filter is clogged. To prevent the clogging, the accumulated PM amount is estimated based on, for example, the pressure difference between pressure sensors provided to sandwich the filter. When the accumulated PM amount reaches a predetermined value, fuel injection control (e.g., increase in the amount of fuel or post injection) of the engine causes unburned HC to be included in an exhaust gas and to be supplied to an oxidation catalyst. This oxidation catalyst is intended to burn unburned HC so as to increase the temperature of the exhaust gas that has reached the filter for removal of PMs through combustion. To promote the PM combustion, a catalytic material is generally loaded on an exhaust gas passage of the filter.

For example, Patent Document 1 describes that a catalyst layer including a composite oxide of Zr and a rare earth metal except Ce and a composite oxide of Ce and a rare earth metal or an alkali earth metal is provided on an exhaust gas passage wall of a filter.

Patent Document 2 proposes that a catalyst layer including a precious metal-doped CePr-based composite oxide and a composite oxide of Zr and a rare earth metal is provided on a passage wall of a filter.

Patent Document 3 shows a filter in which a catalyst layer including a Zr-based composite oxide containing Zr, Nd, and a rare earth metal except Nd and Ce, e.g., La or Pr, is provided on an exhaust gas passage wall. As described above, the catalyst layer including a mixture of a Zr-based composite oxide and a Ce-based composite oxide increases the rate of PM combustion and reduces the time for reusing the filter, thereby enhancing fuel economy.

CITATION LIST

Patent Document

[Patent Document 1] Japanese Unexamined Patent Publication No. 2007-54713
[Patent Document 2] Japanese Unexamined Patent Publication No. 2010-94628
[Patent Document 3] Japanese Unexamined Patent Publication No. 2009-101342

SUMMARY OF THE INVENTION

Technical Problem

A typical catalyzed particulate filter can remove PMs through combustion relatively efficiently when a small amount of PMs are accumulated on the surface of a catalyst layer is gradually burnt. On the other hand, the time necessary for removing PMs through combustion tends to increase as the amount of accumulated PMs increases. Experiments and researches of the inventors of the present invention find that this is because of the following reasons.

Figure 1:
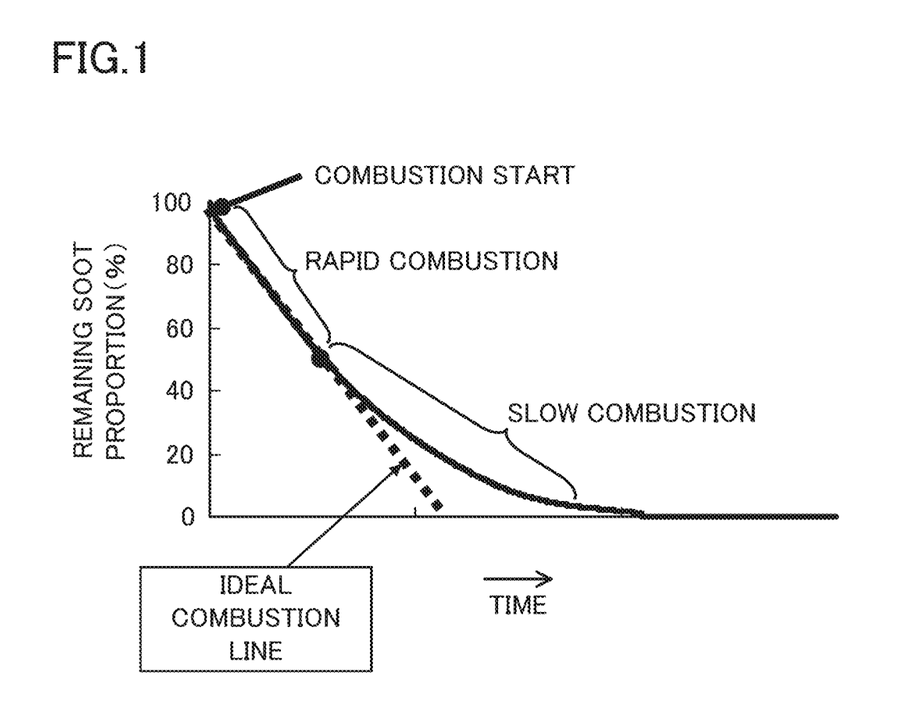
FIG. 1 is a graph schematically showing a change with time in remaining PM percentage in a case where PMs accumulated on a catalyst layer is gradually burnt.

FIG. 1 is a graph schematically showing a change with time in remaining PM percentage when PMs accumulated on a catalyst layer is burnt. Initially, PM combustion rapidly progresses. However, after a lapse of a rapid combustion period (e.g., an initial stage of combustion before the remaining PM percentage decreases from 100% to 50%), the process shifts to a slow combustion period (e.g., a late stage of combustion before the remaining PM percentage decreases from 50% to 0%) in which PMs are slowly burnt. This phenomenon will now be specifically described.

Figure 2:
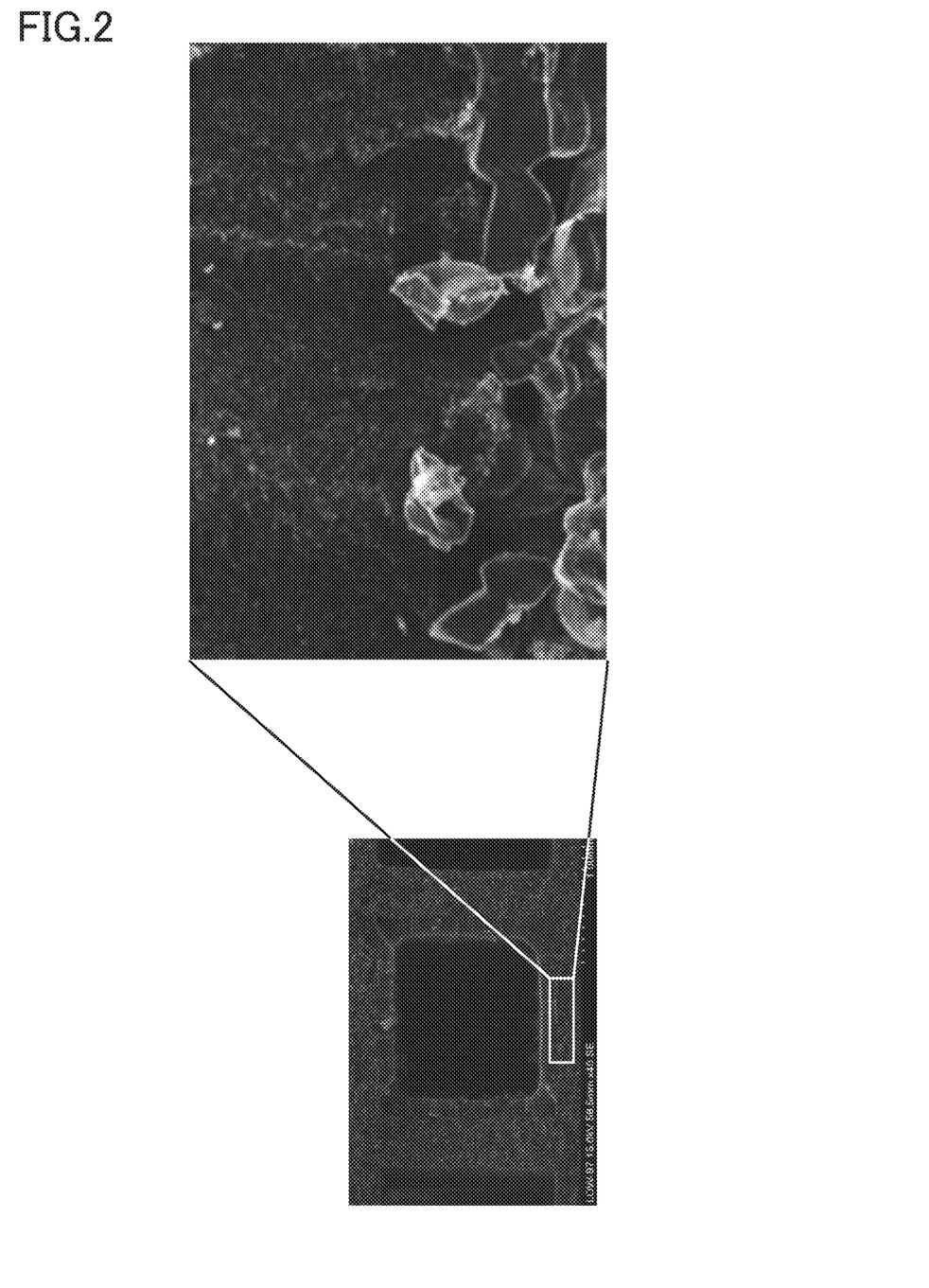
FIG. 2 is a microphotograph showing a state in which an accumulated PM layer is in contact with the catalyst layer (i.e., a state in a rapid combustion period shown in FIG. 1).
Figure 3:
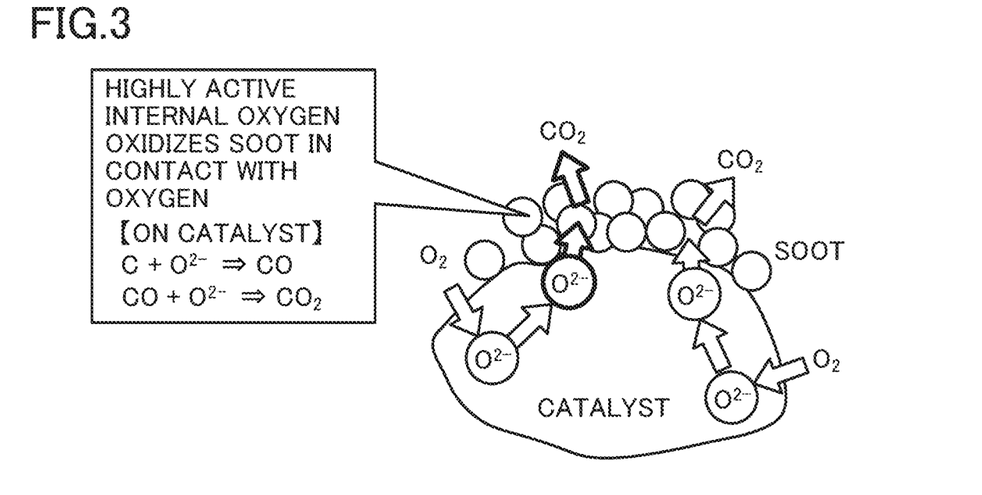
FIG. 3 schematically illustrates a PM combustion mechanism in the rapid combustion period.

As shown in the photographs of FIG. 2, in an initial period of combustion, PMs are in contact with the catalyst layer loaded on the surface of the filter. Thus, if the catalyst layer includes Ce-based oxide particles or Zr-based oxide particles, for example, active inner oxygen at a high activity level released from the oxide particles is supplied to PMs that are in contact with the catalyst layer, as schematically illustrated in FIG. 3. Consequently, PMs on the catalyst layer surface are rapidly burnt.

Figure 4:
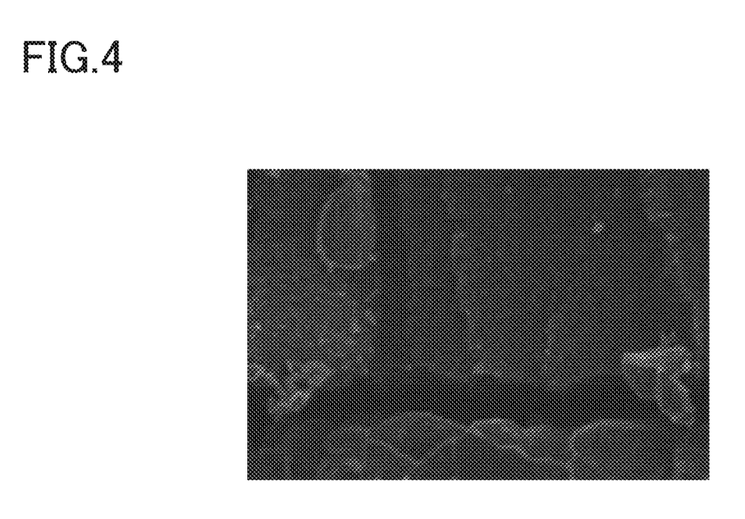
FIG. 4 is a microphotograph showing a state in which a gap is formed between the catalyst layer and an accumulated soot layer (i.e., a state in a slow combustion period shown in FIG. 1).
Figure 5:
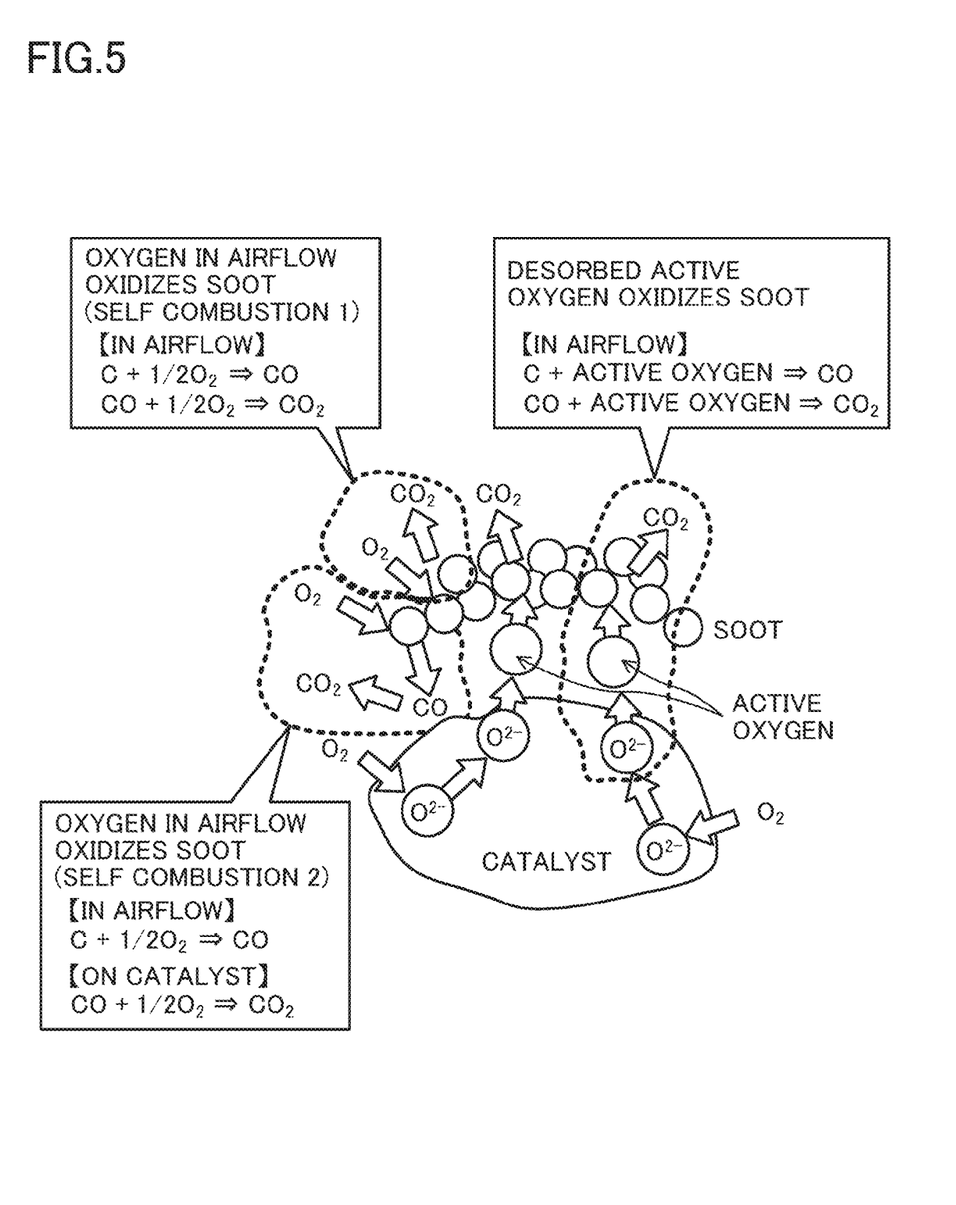
FIG. 5 schematically illustrates a PM combustion mechanism in the slow combustion period.

However, as described above, because of removal of PMs on the catalyst layer surface through combustion, a gap of about several tens of micrometers is partially formed between the catalyst layer and an accumulated PM layer, as shown in the photograph of FIG. 4. Thus, as schematically illustrated in FIG. 5, active oxygen released from the inside of the oxide particles maintains its activity only in a short period, but reduces its activity while passing through the gap, to be normal oxygen that is the same as oxygen in a gas phase, for example. As a result, PM combustion becomes slow. Of course, as illustrated in the upper left portion and lower left portion of FIG. 5, oxygen in the exhaust gas contributes to PM combustion, but this combustion is slower than combustion with the active oxygen.

In view of this, it is conceivable that the catalyst layer is designed to have a large porous inner gap so that PMs easily enter the catalyst layer. This technique is intended to cause PMs to be dispersed not only onto the surface of the catalyst layer but also into the catalyst layer to be accumulated so that a large part of the PMs are in contact with the catalyst and combustion is promoted. However, the large inner gap increases the volume of the catalyst layer, resulting in a problem of high distribution resistance of an exhaust gas passing through the filter. In addition, production of such a catalyst layer disadvantageously increases the fabrication cost.

It is therefore an object of the present invention to promote combustion of PMs accumulated on a filter in both a rapid combustion period and a slow combustion period.

Solution to the Problem

To achieve the object, in an exhaust gas component purification catalytic material of the present invention, praseodymium oxide ($Pr_2O_3$, $Pr_6O_{11}$, hereinafter referred to as $PrO_x$) particles and zirconium (Zr)-based composite oxide (complex oxide) particles are in contact with one another.

Specifically, an exhaust gas component purification catalytic material of the present invention is for use in removal of particulates in an exhaust gas through combustion. The exhaust gas component purification catalytic material includes: composite oxide particles containing zirconium and neodymium and not containing cerium; and praseodymium oxide particles in contact with the composite oxide particles.

Experiments and researches of inventors of the present invention show that a ZrNd-based composite oxide containing Zr and neodymium (Nd) exhibits high ion conduction, and takes ambient oxygen therein through an oxygen exchange reaction to release active oxygen. On the other hand, in a manner similar to cerium oxide ($CeO_2$) typically used as a promoter, $PrO_x$ exhibits large oxygen storage capacity (OSC) and enables a larger amount of oxygen to be exchanged between oxygen in a gas phase and an oxide surface, than $CeO_2$. That is, $PrO_x$ serves as an excellent oxygen source for the ZrNd-based composite oxide. In view of this, in the present invention, composite oxide particles containing Zr and Nd and not containing Ce and $PrO_x$ particles are in contact with one another so that a large amount of oxygen released from the $PrO_x$ particles can be taken into the composite oxide particles nearby, can be supplied through spillover onto the surface of the composite oxide particles, or can be supplied to the composite oxide particles through oxygen ion conduction via a contact interface. As a result, under a condition where PMs are in contact with the catalytic material (i.e., in a rapid combustion period), active oxygen released from the surfaces of the composite oxide particles efficiently promotes PM combustion. On the other hand, in the above-described slow combustion period in which a gap is partially formed between the accumulated PM layer and the catalyst layer, a small amount of PMs are in contact with the ZrNd-based composite oxide. At the contact interface, which is small however, PM combustion is promoted on the surfaces of the ZrNd-based composite oxide particles because of the above-described advantage that $PrO_x$ particles serve as an oxygen source.

In the exhaust gas component purification catalytic material of the present invention, the composite oxide particles and the praseodymium oxide particles may be mixed together and in contact with one another. The composite oxide particles and the praseodymium oxide particles may be mixed together and agglomerated.

In the exhaust gas component purification catalytic material of the present invention, it is preferable that one of the composite oxide particles or the praseodymium oxide particles form cores, and the other are loaded on surfaces of the cores. In this case, the cores may be agglomeration of one of the composite oxide particles or the praseodymium oxide particles.

In a case where the praseodymium oxide particles serve as cores and the composite oxide particles containing Zr and Nd and not containing Ce are loaded on the surfaces of the cores, the composite oxide particles are located at the surface of the catalytic material. Thus, active oxygen released from the composite oxide particles can be efficiently supplied to PMs, thereby increasing the PM combustion rate.

On the other hand, in a case where the composite oxide particles containing Zr and Nd and not containing Ce serve as cores and the praseodymium oxide particles are loaded on the surfaces of the cores, the composite oxide particles are partially covered with the praseodymium oxide particles. Thus, as compared to the above-described case, the active oxygen released from the composite oxide particles is less efficiently supplied to PMs. However, since a large amount of praseodymium oxide particles are in contact with the composite oxide particles, a large amount of oxygen activated by the composite oxide particles is supplied to the praseodymium oxide particles. Thus, the amount of the active oxygen released from the surfaces of the praseodymium oxide particles increases. As a result, the PM combustion rate can be enhanced.

In the exhaust gas component purification catalytic material of the present invention, the composite oxide particles containing Zr and Nd and not containing Ce may be at least one type of composite oxide particles selected from the group consisting of: ZrNd composite oxide particles containing Zr, Nd, and oxygen; ZrNdPr composite oxide particles containing Zr, Nd, Pr, and oxygen; ZrNdLa composite oxide particles containing Zr, Nd, La, and oxygen; and ZrNdY composite oxide particles containing Zr, Nd, Y, and oxygen.

In the exhaust gas component purification catalytic material of the present invention, the cores preferably have an average particle size (i.e., "the number average particle size," where the same holds true for the following description) of greater than or equal to 100 nm and less than or equal to 300 nm, and particles loaded on surfaces of the cores preferably have an average particle size of greater than or equal to 20 nm and less than or equal to 100 nm.

In the exhaust gas component purification catalytic material of the present invention, a mass ratio between the composite oxide particles and the praseodymium oxide particles preferably ranges from 10:90 to 90:10, and more preferably from 10:90 to 50:50.

The exhaust gas component purification catalytic material may be loaded on an exhaust gas passage wall of a particulate filter for collecting particulates in an exhaust gas, or may be included in a catalyst layer located on a cell wall of a honeycomb support with a straight-flow structure for use in, for example, a three-way catalyst.

In this manner, PMs collected and accumulated on a support such as a particulate filter can be efficiently removed through combustion by using the exhaust gas component purification catalytic material.

Advantages of the Invention

An exhaust gas component purification catalytic material and a particulate filter with the catalytic material according to the present invention include composite oxide particles containing Zr and Nd and not containing Ce and praseodymium oxide particles in contact with the composite oxide particles. Thus, the composite oxide particles and the praseodymium oxide particles can efficiently promote PM combustion in combination.

DESCRIPTION OF EMBODIMENT

An embodiment of the present invention will be described with reference to the drawings. Note that the following description of the preferred embodiment is merely illustrative in nature, and is not intended to limit the scope, applications, and use of the invention.

<Catalytic Material>

Figure 6A:
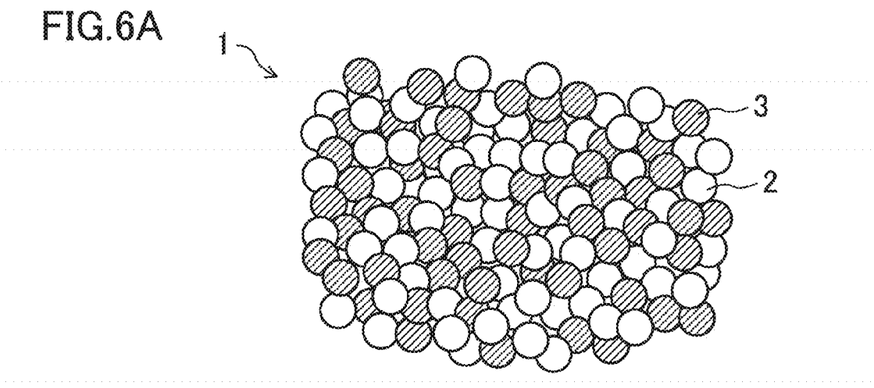
FIG. 6(a) schematically illustrates an exhaust gas component purification catalytic material using a mixture of $PrO_x$ particles and composite oxide particles, FIG. 6(b) schematically illustrates an exhaust gas component purification catalytic material using $PrO_x$ particles as cores and composite oxide particles as a surface loaded material, and FIG. 6(c) schematically illustrates an exhaust gas component purification catalytic material using composite oxide particles as cores and $PrO_x$ particles as a surface loaded material.
Figure 6B:
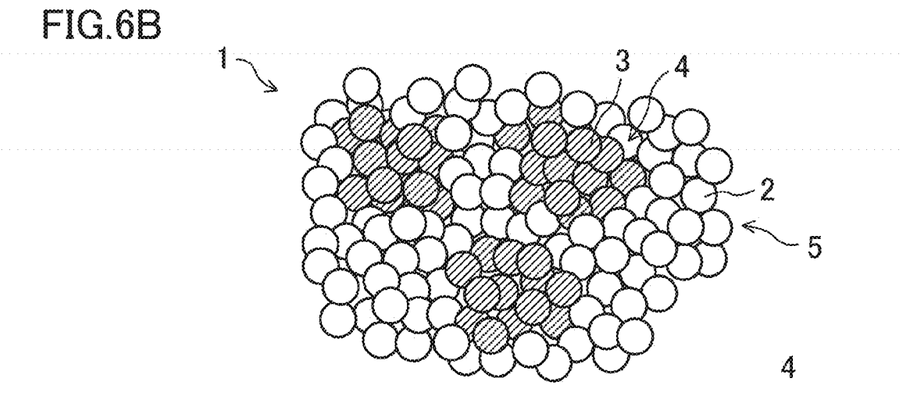
Figure 6C:
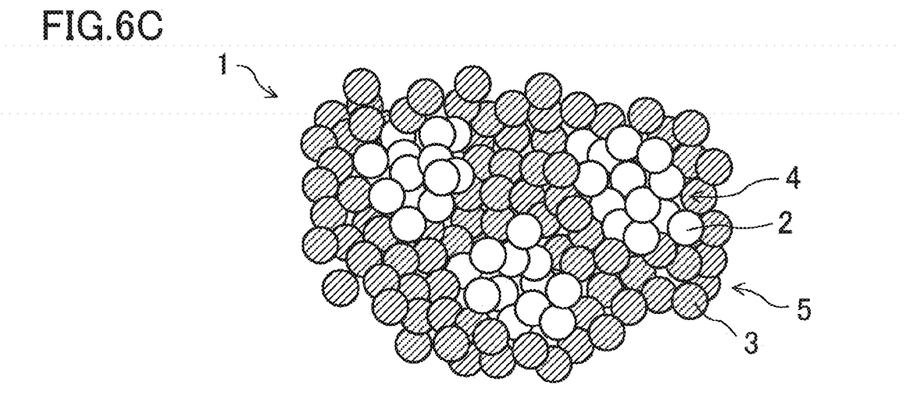

FIGS. 6(a)-6(c) schematically illustrate structures of an exhaust gas component purification catalytic material.

An exhaust gas component purification catalytic material 1 includes: composite oxide particles 2 loaded with a precious metal (not shown) and containing zirconium (Zr) and neodymium (Nd) and not containing cerium (Ce); and praseodymium oxide ($PrO_x$) particles 3 loaded with a precious metal (not shown). The precious metal is, for example, platinum (Pt). As illustrated in FIG. 6(a), in the exhaust gas component purification catalytic material 1, the composite oxide particles 2 and the $PrO_x$ particles 3 are mixed, are in contact with one another, and are irregularly arranged. The composite oxide particles 2 contain Zr oxide as a main component, and Nd is added and dissolved in the Zr oxide. Thus, the composite oxide particles 2 show high ion conduction, and cause an oxygen exchange reaction to take ambient oxygen therein and release active oxygen. The $PrO_x$ particles 3 show a large oxygen storage capacity (OSC), and serves as an excellent oxygen source for a composite oxide. In the exhaust gas component purification catalytic material 1, since the composite oxide particles 2 and the $PrO_x$ particles 3 are mixed and in contact with one another, the functions of the particles 2 and 3 are efficiently exhibited. Thus, the exhaust gas component purification catalytic material 1 is advantageous for PM removal through combustion.

In addition to such a structure of the exhaust gas component purification catalytic material 1, the composite oxide particles 2 are loaded as a surface loaded material 5 on the surfaces of cores 4 composed of the $PrO_x$ particles 3, as illustrated in FIG. 6(b). The cores 4 are formed by agglomeration of, for example, the $PrO_x$ particles 3. As described above, since the composite oxide particles are located at the surface of the catalytic material, active oxygen released from the composite oxide particles is efficiently supplied to PMs, thereby enhancing the PM combustion rate.

Alternatively, as illustrated in FIG. 6(c), the $PrO_x$ particles 3 may be loaded as the surface loaded material 5 on the surfaces of cores 4 composed of the composite oxide particles 2. In this case, the cores 4 are formed by agglomeration of, for example, the composite oxide particles 2. In this state, a large amount of praseodymium oxide particles are in contact with the composite oxide particles, and a large amount of oxygen activated by the composite oxide particles are supplied to praseodymium particles. Consequently, a large amount of active oxygen is released from the surfaces of the praseodymium oxide particles, thereby enhancing the PM combustion rate.

To form the exhaust gas component purification catalytic materials 1 including the cores 4 composed of agglomerated particles illustrated in FIGS. 6(b) and 6(c), each of the average particle size of the composite oxide particles 2 and the average particle size of the $PrO_x$ particles 3 is preferably greater than or equal to 20 nm and less than or equal 100 nm, and the average particle size of the cores 4 is preferably greater than or equal to 100 nm and less than or equal to 300 nm.

In each of the above-described cases, to obtain the exhaust gas component purification catalytic material 1 that shows the functions of the composite oxide particles 2 and the $PrO_x$ particles 3 and is used for efficient PM combustion, the mass ratio between the composite oxide particles 2 and the $PrO_x$ particles 3 is preferably in the range from 10:90 to 90:10, and more preferably in the range from 10:90 to 50:50.

A method for preparing an exhaust gas component purification catalytic material according to this embodiment will now be described.

In the case of preparing an exhaust gas component purification catalytic material illustrated in FIG. 6(a), first, composite oxide powder containing Zr and Nd and pulverized to have an average particle size of about 20 nm to about 100 nm and $PrO_x$ powder are uniformly mixed at a predetermined mass ratio, and formed into slurry. In the case of using Pt as a catalytic metal, the slurry is supplemented with a solution in which a dinitrodiamine platinum nitrate solution is diluted with ion-exchanged water to have a predetermined Pt loading amount, and evaporation to dryness is performed. The resulting material is dried in the air at 150° C., is pulverized, and calcined in the air at 500° C. for two hours, thereby obtaining a catalytic material.

In the case of preparing an exhaust gas component purification catalytic material illustrated in FIG. 6(b), first, composite oxide powder containing Zr and Nd and pulverized to have an average particle size of about 20 nm to about 100 nm and a Pr nitrate aqueous solution are mixed and formed into slurry. This slurry is mixed with an ammonia water solution, and a coprecipitate is obtained. Thereafter, the obtained coprecipitate is dried at 150° C. and calcined at 500° C., and then Pt is loaded on the resulting coprecipitate in a manner similar to that described above, thereby obtaining a catalytic material having cores whose average particle size is about 100 nm to about 300 nm.

In the case of preparing an exhaust gas component purification catalytic material illustrated in FIG. 6(c), first, Pr oxide powder pulverized to have an average particle size of about 20 nm to about 100 nm and a predetermined amount of a nitrate aqueous solution containing Zr and Nd are mixed and formed into slurry. This slurry is mixed with an ammonia water solution, and a coprecipitate is obtained. Thereafter, the obtained coprecipitate is dried at 150° C. and calcined at 500° C., and then Pt is loaded on the resulting coprecipitate in a manner similar to that described above, thereby obtaining a catalytic material having cores whose average particle size is about 100 nm to about 300 nm.

The exhaust gas component purification catalytic material obtained in this manner is loaded on an exhaust gas passage wall of a particulate filter for collecting, for example, PMs.

<Structure of Particulate Filter>

A structure of a particulate filter for collecting PMs will now be described.

Figure 7:
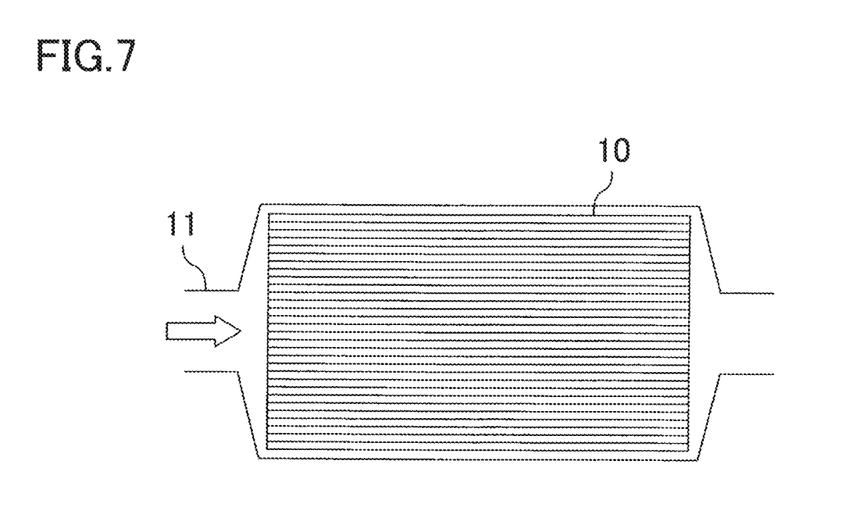
FIG. 7 illustrates a state in which a particulate filter is disposed on an exhaust gas passage of an engine.

FIG. 7 illustrates a particulate filter (hereinafter simply referred to as a "filter") 10 disposed in an exhaust gas passage 11 of a diesel engine. An oxidation catalyst (not shown) in which a catalytic metal, which is typically Pt and Pd, is loaded on a support such as activated alumina can be disposed upstream of the filter 10 in the exhaust gas passage 11. This oxidation catalyst may be the exhaust gas component purification catalytic material according to this embodiment. Such an oxidation catalyst disposed upstream of the filter 10 causes oxidation of HC and CO in an exhaust gas, and heat generated by combustion in this oxidation increases the temperature of the exhaust gas flowing into the filter 10 so that the filter 10 is heated. Thus, this oxidation catalyst is advantageous for removing PMs through combustion. In addition, the oxidation catalyst oxidizes NO into $NO_2$, which is supplied as an oxidizing agent for burning PMs to the filter 10.

Figure 8:
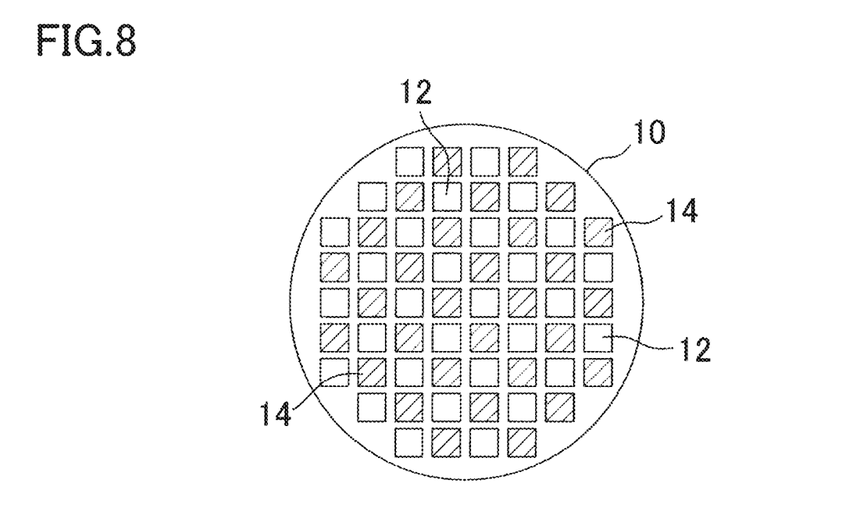
FIG. 8 is a front view schematically illustrating the filter.
Figure 9:
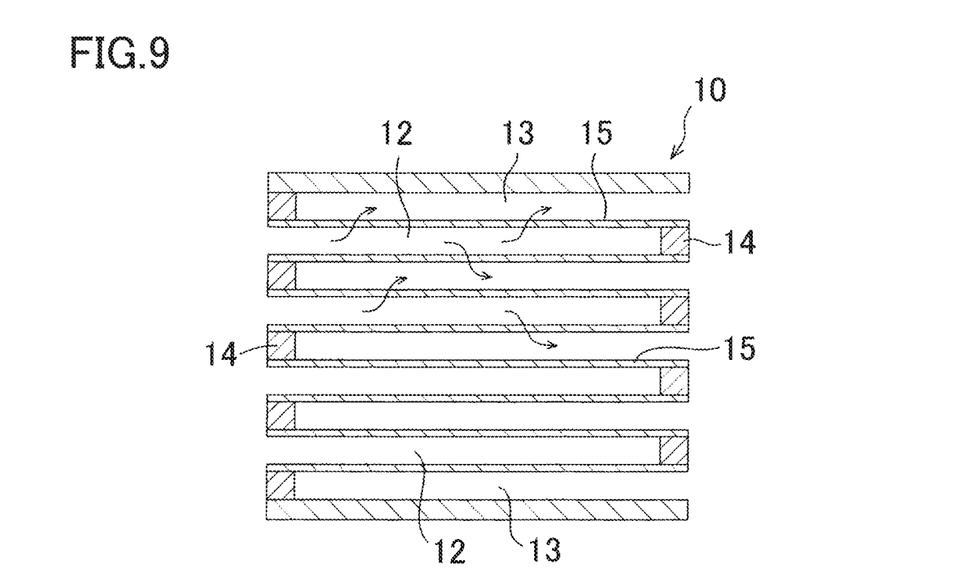
FIG. 9 is a vertical cross-sectional view schematically illustrating the filter.

As schematically illustrated in FIGS. 8 and 9, the filter 10 has a honeycomb structure and includes a large number of parallel exhaust gas passages 12 and 13. Specifically, the filter 10 includes the exhaust gas inlet paths 2 whose downstream ends are blocked by stoppers 14 and the exhaust gas outlet paths 13 whose upstream ends are blocked by stoppers 14. The exhaust gas inlet paths 12 and the exhaust gas outlet paths 13 are alternately arranged and are separated from one another by thin partitions 15. The hatched portions in FIG. 8 indicate the stoppers 14 at the upstream ends of the exhaust gas outlet paths 13.

Figure 10:
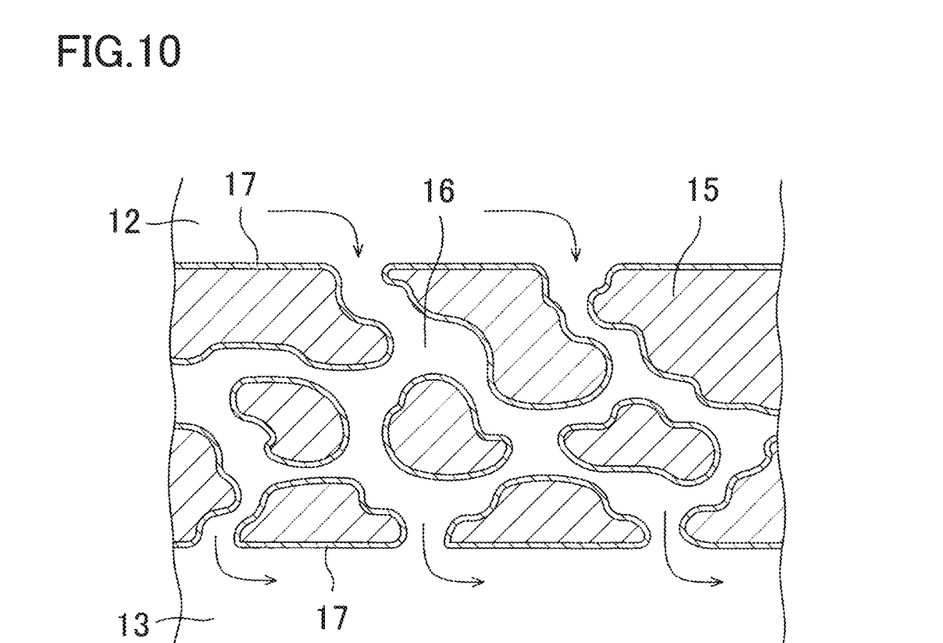
FIG. 10 is an enlarged cross-sectional view schematically illustrating an exhaust gas passage wall of the filter.

In the filter 10, a filter body including the partitions 15 is made of an inorganic porous material such as cordierite, SiC, $Si_3N_4$, or sialon. Exhaust gas that has flown into the exhaust gas inlet paths 12 passes through the partitions 15 nearby and flows into the adjacent exhaust gas outlet paths 13, as indicated by the arrows in FIG. 9. Specifically, as illustrated in FIG. 10, the partitions 15 include minute pores (exhaust gas passages) 16 allowing the exhaust gas inlet paths 12 to communicate with the exhaust gas outlet paths 13, and exhaust gas passes through the pores 16. PMs are mainly captured and accumulated on the walls of the exhaust gas inlet paths 12 and the pores 16.

A catalyst layer 17 is formed on wall surfaces constituting the exhaust gas passages (including the exhaust gas inlet paths 12, the exhaust gas outlet paths 13, and the pores 16) of the filter body. The catalyst layer does not need to be formed on the walls facing the exhaust gas outlet paths 13.

EXAMPLES

Examples for specifically describing an exhaust gas component purification catalytic material according to the present invention will now be presented.

In this example, as composite oxide (Zr-based composite oxide) particles containing Zr and Nd and not containing Ce, a ZrNd composite oxide (ZN: Examples 1-5, 9, and 11-15) containing Zr, Nd, and oxygen with a mole ratio of $ZrO_2$:$Nd_2O_3$=85:15, a ZrNdPr composite oxide (ZNP: Examples 6, 10, and 16) containing Zr, Nd, Pr, and oxygen with a mole ratio of $ZrO_2$:$Nd_2O_3$:$Pr_2O_3$=65:15:20, a ZrNdLa composite oxide (ZNL: Examples 7 and 17) containing Zr, Nd, La, and oxygen with a mole ratio of $ZrO_2$:$Nd_2O_3$:$La_2O_3$=65: 15:20, and a ZrNdY composite oxide (ZNY: Examples 8 and 18) containing Zr, Nd, Y, and oxygen with a mole ratio of $ZrO_2$:$Nd_2O_3$:$Y_2O_3$=65:15:20 were used. With these composite oxide particles, $PrO_x$ particles were used.

On the other hand, in Comparative Examples for comparison with Examples of the invention, the composite oxides were used as composite oxide particles, $PrO_x$ particles were replaced by $CeO_2$ particles (Comparative Examples 1-10). In addition, instead of the composite oxide particles, an oxide (CZN) with a mole ratio of $CeO_2$:$ZrO_2$:$Nd_2O_3$=24: 72:4 was used (Comparative Example 11). In Comparative Example 12, particles not containing the above-described composite oxide were used.

Table 1 shows compositions of exhaust gas component purification catalytic materials prepared in Examples and Comparative Examples.

TABLE 1

| | CATALYTIC MATERIAL STRUCTURE | | MASS RATIO (Zr-BASED:PrOx or GeO$_2$) | CARBON COMBUSTION RATE [mg/min-L] (COMBUSTION RATE OF 0-90%) |
|---|---|---|---|---|
| COMPARATIVE EXAMPLE 1 | PHYSICAL MIXTURE ZN + CeO$_2$ | | 0:100 | 15.5 |
| COMPARATIVE EXAMPLE 2 | | | 10:90 | 15.7 |
| COMPARATIVE EXAMPLE 3 | | | 30:70 | 16.3 |
| COMPARATIVE EXAMPLE 4 | | | 50:50 | 17.2 |
| COMPARATIVE EXAMPLE 5 | | | 70:30 | 17.8 |
| COMPARATIVE EXAMPLE 6 | | | 90:10 | 17.3 |
| COMPARATIVE EXAMPLE 7 | | | 100:0 | 17.3 |
| COMPARATIVE EXAMPLE 8 | PHYSICAL MIXTURE | ZNP + CeO$_2$ | 30:70 | 18.2 |
| COMPARATIVE EXAMPLE 9 | PHYSICAL MIXTURE | ZNL + CeO$_2$ | 30:70 | 17.7 |
| COMPARATIVE EXAMPLE 10 | PHYSICAL MIXTURE | ZNY + CeO$_2$ | 30:70 | 17.8 |

TABLE 1-continued

| | CATALYTIC MATERIAL STRUCTURE | MASS RATIO (Zr-BASED:PrOx or GeO$_2$) | CARBON COMBUSTION RATE [mg/min-L] (COMBUSTION RATE OF 0-90%) |
|---|---|---|---|
| COMPARATIVE EXAMPLE 11 | PHYSICAL MIXTURE CZN + PrO$_x$ | 30:70 | 16.5 |
| COMPARATIVE EXAMPLE 12 | PHYSICAL MIXTURE ZN + PrO$_x$ | 0:100 | 17.9 |
| EXAMPLE 1 | | 10:90 | 19.2 |
| EXAMPLE 2 | | 30:70 | 20.3 |
| EXAMPLE 3 | | 50:50 | 19.3 |
| EXAMPLE 4 | | 70:30 | 18.6 |
| EXAMPLE 5 | | 90:10 | 18.4 |
| COMPARATIVE EXAMPLE 7 | | 100:0 | 17.3 |
| EXAMPLE 6 | PHYSICAL MIXTURE ZNP + PrO$_x$ | 30:70 | 22.2 |
| EXAMPLE 7 | PHYSICAL MIXTURE ZNL + PrO$_x$ | 30:70 | 21.3 |
| EXAMPLE 8 | PHYSICAL MIXTURE ZNY + PrO$_x$ | 30:70 | 19.7 |
| EXAMPLE 9 | SURFACE LOADED MATERIAL PrO$_x$, CORE ZN | 70:30 | 21.9 |
| EXAMPLE 10 | SURFACE LOADED MATERIAL PrO$_x$, CORE ZN | 70:30 | 23.8 |
| EXAMPLE 11 | SURFACE LOADED MATERIAK ZN, CORE PrO$_x$ | 10:90 | 22.7 |
| EXAMPLE 12 | | 30:70 | 26.2 |
| EXAMPLE 13 | | 50:50 | 25.4 |
| EXAMPLE 14 | | 70:30 | 21.9 |
| EXAMPLE 15 | | 90:10 | 19.7 |
| EXAMPLE 16 | SURFACE LOADED MATERIAL ZNP, CORE PrO$_x$ | 30:70 | 29.0 |
| EXAMPLE 17 | SURFACE LOADED MATERIAL ZNL CORE PrO$_x$ | 30:70 | 28.1 |
| EXAMPLE 18 | SURFACE LOADED MATERIAL ZNY, CORE PrO$_x$ | 30:70 | 27.2 |

Catalytic materials of Examples 1-8 and Comparative Examples 1-12 were prepared by the catalytic material preparation method (physical mixture) illustrated in FIG. 6(a). Catalytic materials of Examples 9 and 10 were prepared by the catalytic material preparation method (using PrO$_x$ as the surface loaded material) illustrated in FIG. 6(c). Catalytic materials of Examples 11-18 were prepared by the catalytic material preparation method (using PrO$_x$ as cores) illustrated in FIG. 6(b).

A method for evaluating carbon combustion of exhaust gas component purification catalytic materials of Examples and Comparative Examples will be described.

To evaluate PM combustion of the exhaust gas component purification catalytic materials, filters were coated with the exhaust gas component purification catalytic materials of Examples and Comparative Examples, thereby obtaining sample filters (catalyzed particulate filters). Carbon (carbon black) was deposited on the sample filters subjected to aging, and carbon combustion rates were measured. The aging is a heat treatment in which a sample filter is held in the air at 800° C. for 24 hours.

Figure 11:
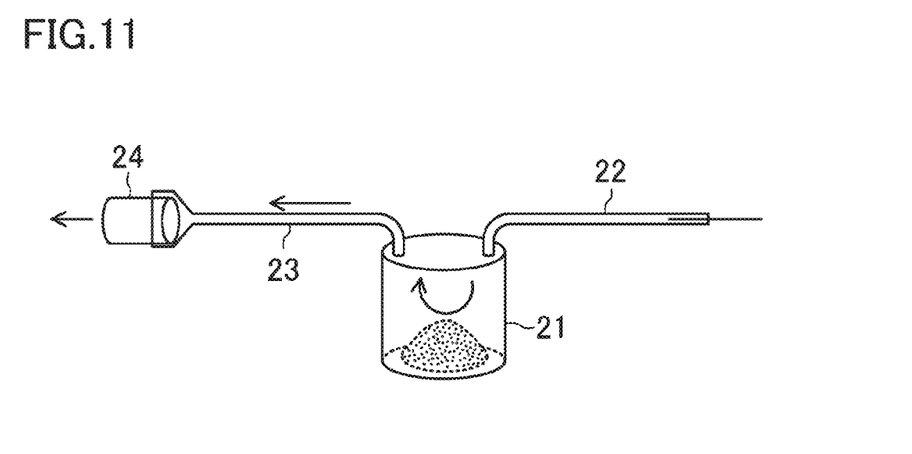
FIG. 11 is a perspective view illustrating an instrument for depositing carbon.

FIG. 11 is an instrument for depositing carbon. In FIG. 11, reference character 21 is a container in which carbon powder is placed, and is connected to an air supply pipe 22 and a carbon powder conveying pipe 23. Carbon powder is placed in the container 21, and a sample filter 24 is fitted into a tip of the conveying pipe 23 so that air is blown into the container 21 through the air supply pipe 22. Then, carbon powder flows in the conveying pipe 23 together with air and is deposited on the sample filter 24 while stirring up and being diffused in the container 21.

Carbon powder for use with the instrument is previously crushed with an ultrasonic process such that agglomeration is eliminated. In the container 21, carbon powder is placed such that the amount of deposited carbon powder per 1 L of a sample filter is 7 g/L. Specifically, the slip amount (i.e., the amount of carbon that is not deposited on the sample filter 24 and slips through the filter) is obtained beforehand, and carbon powder in an amount that is a sum of the deposited amount (7 g/L) and the slip amount is placed in the container 21. Air is blown at a rate of SV=12000/h for three minutes.

Each of the obtained sample filter was attached to a simulated gas distribution reactor, and with an N$_2$ gas being distributed in the reactor, the gas temperature was increased. After the filter inlet temperature had been stabilized at 580° C., the N$_2$ gas was switched to a simulation exhaust gas (with 7.5% of O$_2$ and residue of N$_2$), and the simulation exhaust gas was caused to flow at a space velocity of 40000/h. Then, the concentrations, in the gas, of CO and CO$_2$ produced by combustion of carbon were measured at real time, and from these concentrations, a carbon combustion rate (the amount of PM combustion per a unit time) was calculated for each predetermined time by using the following equation:

Carbon combustion rate(g/h) = {gas flow rate(L/h)× [(CO+CO$_2$)concentration(ppm)/(1×10$^6$)]}×12 (g/mol)/ 22.4 (L/mol)

Based on the carbon combustion rate for each predetermined time, the change in carbon combustion amount integrated value with time was obtained, and a carbon combustion rate (the PM combustion amount (mg/min-L) per one minute with a 1-L filter) was obtained from a period in which the carbon combustion percentage increases from 0% to 90% and the integrated value of carbon combustion amounts in the period. The result is shown in the rightmost column of Table 1 and FIGS. 12-14.

Figure 12:
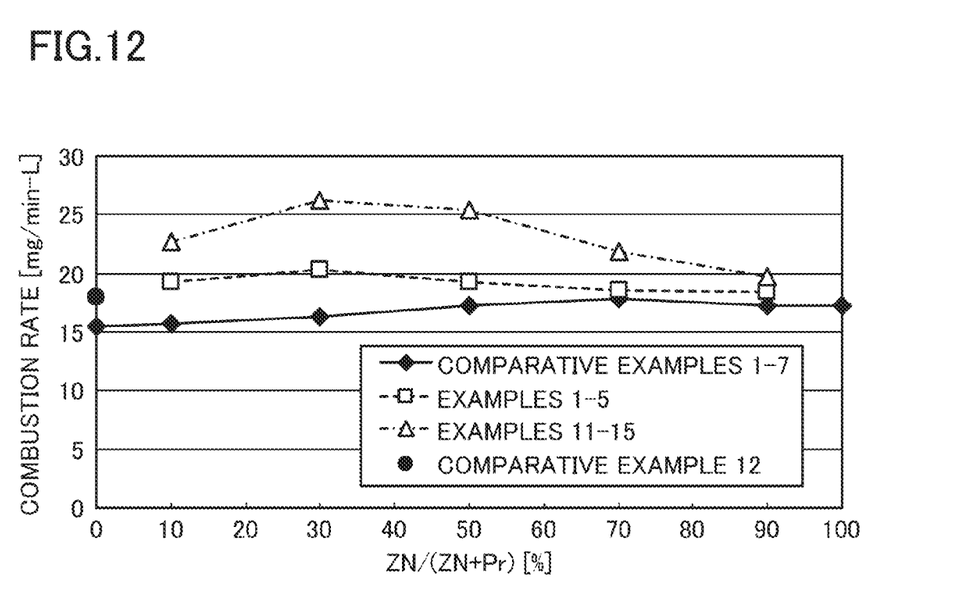
FIG. 12 is a graph showing a relationship between a carbon combustion rate and a mass ratio between a composite oxide and $PrO_x$ in an exhaust gas component purification catalytic material.

FIG. 12 shows a relationship between a carbon combustion rate and a mass ratio between a Zr-based composite oxide containing Zr and Nd and not containing Ce and PrO$_x$ or CeO$_2$.

As shown in Table 1 and FIG. 12, a comparison between Examples 1-5 (physical mixture of ZN and PrO$_x$) and Comparative Examples 2-6 (physical mixture of ZN and CeO$_2$) shows that Examples 1-5 using PrO$_x$ exhibit carbon combustion rates higher than Comparative Examples 2-6, with any mass ratio of oxide. A comparison between Examples 1-5 and Examples 11-15 (using PrO$_x$ as cores and ZN as a surface loaded material) shows that Examples 11-15 using $PrO_x$ as cores exhibit carbon combustion rates higher than Examples 1-5, with any mass ratio of oxide. As shown in FIG. 12, with respect to the mass ratio of oxide, when the mass ratio of $ZN:PrO_x$ is in the range from 10:90 to 50:50, the carbon combustion rate can be further increased.

Figure 13:
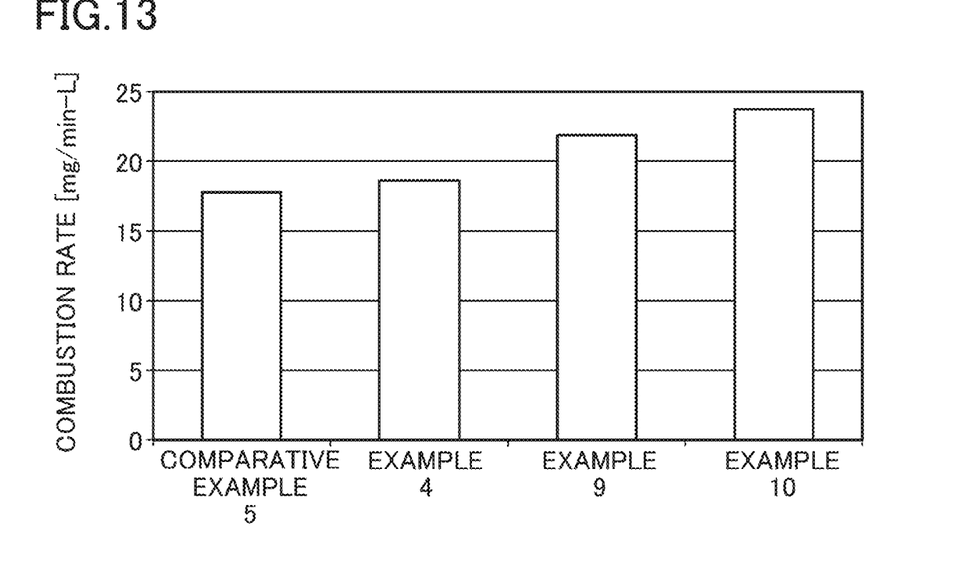
FIG. 13 is a graph showing a relationship between a carbon combustion rate and a structure of the exhaust gas component purification catalytic material.

FIG. 13 is a graph for comparison in a case where the mass ratio between the Zr-based composite oxide and $PrO_x$ or $CeO_2$ is 70:30. As shown in Table 1 and FIG. 13, Examples 4, 9, and 10 using $PrO_x$ exhibit carbon combustion rates higher than Comparative Example 5 using $CeO_2$, and Examples 9 and 10 using the Zr-based composite oxide as cores exhibit carbon combustion rates higher than Examples 4, 9, and 10.

Figure 14:
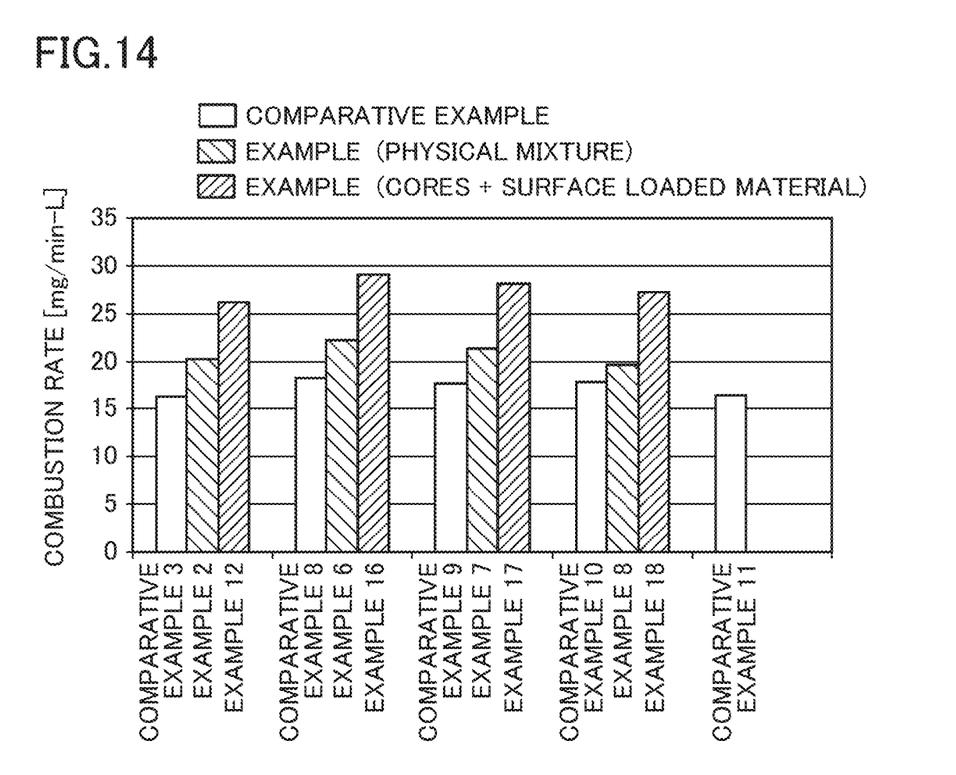
FIG. 14 is a graph showing a relationship between a carbon combustion rate and a structure of the exhaust gas component purification catalytic material.

FIG. 14 is a graph for comparison in a case where the mass ratio between the Zr-based composite oxide and $PrO_x$ or $CeO_2$ is 30:70. As shown in Table 1 and FIG. 14, in any of the cases of using ZN, ZNP, ZNL, and ZNY for the Zr-based composite oxide, mixture of the Zr-based composite oxide with $PrO_x$ (i.e., Examples 2 and 6-8) exhibit carbon combustion rates higher than mixture of the Zr-based composite oxide with $CeO_2$ (i.e., Comparative Examples 3 and 8-10). Using $PrO_x$ as cores (i.e., Examples 12 and 16-18) increases the carbon combustion rate. Mixture of CZN and $PrO_x$ (i.e., Comparative Example 11) shows a carbon combustion rate substantially equal to those of Comparative Examples 3 and 8-10.

As described above, in the exhaust gas component purification catalytic material, mixture of $PrO_x$ instead of $CeO_2$ in the Zr-based composite oxide can increase the carbon combustion rate. In addition, the carbon combustion rate can be further increased when one of the Zr-based composite oxide or $PrO_x$ is used as cores and the other is used as the surface loaded material.

DESCRIPTION OF REFERENCE CHARACTERS 1 exhaust gas component purification catalytic material
2 composite oxide particles
3 praseodymium oxide ($PrO_x$) particles
4 core
5 surface loaded material
10 filter
11 exhaust gas passage
12 exhaust gas inlet path (exhaust gas passage)
13 exhaust gas outlet path (exhaust gas passage)
14 stopper
15 partition
16 pore (exhaust gas passage)
17 catalyst layer

The invention claimed is:

1. An exhaust gas component purification catalytic material for use in removal of particulates in an exhaust gas through combustion, the exhaust gas component purification catalytic material comprising:
composite oxide particles containing zirconium and neodymium and not containing cerium; and
praseodymium oxide particles in contact with the composite oxide particles, wherein
one of the composite oxide particles or the praseodymium oxide particles form cores, and the other are loaded on surfaces of the cores.

2. The exhaust gas component purification catalytic material of claim 1, wherein
the composite oxide particles are at least one type of composite oxide particles selected from the group consisting of: ZrNd composite oxide particles containing zirconium, neodymium, and oxygen; ZrNdPr composite oxide particles containing zirconium, neodymium, praseodymium, and oxygen; ZrNdLa composite oxide particles containing zirconium, neodymium, lanthanum, and oxygen; and ZrNdY composite oxide particles containing zirconium, neodymiumm, yttrium, and oxygen.

3. A particulate filter for collecting particulates in an exhaust gas, the particulate filter comprising:
an exhaust gas passage wall, wherein
the exhaust gas component purification catalytic material of claim 2 is loaded on the exhaust gas passage wall.

4. The exhaust gas component purification catalytic material of claim 1, wherein
the cores have an average particle size of greater than or equal to 100 nm and less than or equal to 300 nm, and
particles loaded on surfaces of the cores have an average particle size of greater than or equal to 20 nm and less than or equal to 100 nm.

5. A particulate filter for collecting particulates in an exhaust gas, the particulate filter comprising:
an exhaust gas passage wall, wherein
the exhaust gas component purification catalytic material of claim 4 is loaded on the exhaust gas passage wall.

6. The exhaust gas component purification catalytic material of claim 1, wherein
a mass ratio between the composite oxide particles and the praseodymium oxide particles ranges from 10:90 to 90:10.

7. The exhaust gas component purification catalytic material of claim 6, wherein
a mass ratio between the composite oxide particles and the praseodymium oxide particles ranges from 10:90 to 50:50.

8. A particulate filter for collecting particulates in an exhaust gas, the particulate filter comprising:
an exhaust gas passage wall, wherein
the exhaust gas component purification catalytic material of claim 7 is loaded on the exhaust gas passage wall.

9. A particulate filter for collecting particulates in an exhaust gas, the particulate filter comprising:
an exhaust gas passage wall, wherein
the exhaust gas component purification catalytic material of claim 6 is loaded on the exhaust gas passage wall.

10. A particulate filter for collecting particulates in an exhaust gas of claim 9, wherein
a mass ratio between the composite oxide particles and the praseodymium oxide particles ranges from 10:90 to 50:50.

11. A particulate filter for collecting particulates in an exhaust gas, the particulate filter comprising:
an exhaust gas passage wall, wherein
the exhaust gas component purification catalytic material of claim 1 is loaded on the exhaust gas passage wall.

* * * * *